(12) United States Patent
Fukumori et al.

(10) Patent No.: US 9,854,825 B2
(45) Date of Patent: Jan. 2, 2018

(54) RETORT RICE MEAL PRODUCING SYSTEM

(75) Inventors: Takeshi Fukumori, Tokyo (JP); Keishi Wakabayashi, Tokyo (JP); Fuminori Harada, Hiroshima (JP); Toshinori Kawamoto, Hiroshima (JP)

(73) Assignee: SATAKE CORPORATION, Tokyo (JP)

(*) Notice: Subject to any disclaimer, the term of this patent is extended or adjusted under 35 U.S.C. 154(b) by 71 days.

(21) Appl. No.: 14/110,918

(22) PCT Filed: Apr. 15, 2011

(86) PCT No.: PCT/JP2011/002224
§ 371 (c)(1),
(2), (4) Date: Oct. 25, 2013

(87) PCT Pub. No.: WO2012/140700
PCT Pub. Date: Oct. 18, 2012

(65) Prior Publication Data
US 2014/0109774 A1    Apr. 24, 2014

(51) Int. Cl.
*A23L 3/04*    (2006.01)
*A23L 3/14*    (2006.01)
(Continued)

(52) U.S. Cl.
CPC *A23L 1/10* (2013.01); *A23L 7/10* (2016.08); *A23L 7/1965* (2016.08); *A47J 27/04* (2013.01)

(58) Field of Classification Search
CPC . A23L 1/10; A23L 1/1826; A23L 7/10; A23L 7/1963; A23L 7/1965; A23L 3/10; A23L 3/14; A47J 27/04; A47J 2027/043
(Continued)

(56) References Cited

U.S. PATENT DOCUMENTS 4,222,727 A * 9/1980 Adachi ............... B01J 2/10
264/117
4,459,524 A * 7/1984 Oota et al. ............ 318/484
(Continued)

FOREIGN PATENT DOCUMENTS

CN    1522594 A    8/2004
JP    S58-179445 A    10/1983
(Continued)

OTHER PUBLICATIONS

International Preliminary Report for PCT/JP2011/002224 dated Oct. 15, 2013.
(Continued)

*Primary Examiner* — Michael Hoang
(74) *Attorney, Agent, or Firm* — Orion Consulting, Ltd.; Joseph P. Farrar

(57) ABSTRACT

A retort rice meal producing system includes a pressurized steamer mechanism performing a steam heating process on raw rice under pressurizing, a steamed-rice single granulation mechanism removing surface-layer moisture from the steamed rice processed for single granulation as being conveyed by a conveyer, a quantitative filling mechanism of measuring the steamed rice subjected to single granulation for each pack and filling a container with the steamed rice, a packing mechanism further filling the steamed-rice-filled container filled with the steamed rice with at least an amount of a liquid such as a rice-cooking liquid required for soaking and moisture absorption and air for allocating a head space, and sealing the container, a soaking/moisture-absorbing mechanism reversing a package of the sealed container a plurality of times and causing the rice-cooking liquid to be absorbed into the steamed rice, and a retort sterilizing apparatus.

3 Claims, 7 Drawing Sheets

(51) Int. Cl.
    *A23L 1/10*      (2006.01)
    *A47J 27/04*     (2006.01)
    *A23L 7/10*      (2016.01)
    *A23L 7/196*     (2016.01)

(58) Field of Classification Search
    USPC .......... 99/330, 352–353, 355–356, 359–361,
                    99/367, 371; 426/392, 396–397, 399,
                    426/402–403, 405–407
    See application file for complete search history.

(56) References Cited

U.S. PATENT DOCUMENTS

| | | | | |
|---|---|---|---|---|
| 4,779,523 | A * | 10/1988 | Hiroshima | 99/404 |
| 4,986,995 | A * | 1/1991 | Kobayashi et al. | 426/412 |
| 5,613,428 | A * | 3/1997 | Kendall et al. | 99/473 |
| 5,917,927 | A * | 6/1999 | Satake et al. | 382/110 |
| 6,311,611 | B1 * | 11/2001 | Frenkel et al. | 99/469 |
| 6,352,021 | B1 * | 3/2002 | Panella et al. | 99/468 |
| 2004/0126476 | A1 * | 7/2004 | Kanemoto et al. | 426/615 |
| 2010/0242838 | A1 * | 9/2010 | Fukumori | A23P 20/12 118/58 |
| 2010/0323087 | A1 | 12/2010 | Fukumori et al. | |
| 2011/0086147 | A1 * | 4/2011 | van der Ent | 426/416 |

FOREIGN PATENT DOCUMENTS

| | | |
|---|---|---|
| JP | S61-268143 A | 11/1986 |
| JP | S62-005574 A | 10/1987 |
| JP | H01-46102 B2 | 10/1989 |
| JP | 2002-142693 A | 5/1993 |
| JP | H05-192099 A | 8/1993 |
| JP | H05-207855 A | 8/1993 |
| JP | H05-219904 A | 8/1993 |
| JP | H06-303926 A | 11/1994 |
| JP | 2003-102408 A | 4/2003 |
| JP | 2004-049216 A | 2/2004 |
| JP | 2004-159561 A | 6/2004 |
| JP | 2004-229580 A | 8/2004 |
| JP | 2006-174780 A | 7/2006 |
| JP | 4613610 B2 | 7/2006 |
| JP | 2008-000086 A | 1/2008 |
| JP | 2008-220327 A | 9/2008 |
| JP | 2011-083196 A | 4/2011 |

OTHER PUBLICATIONS

International Search Report for PCT/JP2011/002224 dated Jul. 19, 2011.
Written Opinion for PCT/JP2011/002224 dated Jul. 19, 2011.

* cited by examiner

RETORT RICE MEAL PRODUCING SYSTEM

TECHNICAL FIELD

The present invention relates to a retort rice meal producing system of producing a retort rice meal and, in more detail, to a retort rice meal producing system for total production from raw rice up to a retort rice meal.

BACKGROUND ART

In recent years, various types of retort rice meals that can be eaten only by heating in hot water or a microwave oven have been commercially available, and many technologies for producing retort rice meals have been suggested (refer to Patent Document 1 to Patent Document 3).

For example, Patent Document 3 describes a retort rice meal producing apparatus which includes a cooking container including heating, cooling, and mixing mechanisms, a retort pouch filling apparatus coupled to the cooking container via a transfer line with a pumping pump and having a filling nozzle for filling a retort pouch with a raw material through the transfer line and a sealer hermetically sealing an opening of the retort pouch filled with the raw material, and a retort sterilizer performing a heat treatment on the hermetically-sealed retort pouch and performing final cooking and sterilization.

In the apparatus disclosed in Patent Document 3, in the cooking container, raw rice cleaned and absorbing moisture is partially added to a cooking liquid containing a viscosity adjusting component, and is kept at a cooking temperature for incomplete cooking. Then, cooling is performed at a temperature equal to or lower than the cooking temperature, and the remaining raw rice is added and mixed, and then obtained mixture is pumped and conveyed via the transfer line to fill a retort pouch from a filling nozzle in the retort pouch filling apparatus and the opening of the retort pouch is hermetically sealed with the sealer. Then, cooking by heat and a sterilizing process are performed in the retort sterilizer. With this, a retort rice meal is produced.

According to the apparatus disclosed in Patent Document 3, in the cooking container, the raw rice is partially added to the cooking liquid for incomplete cooking and then the remaining raw rice is added. Therefore, the ratio of rice grains crushed at the time of pumping and transferring the mixture to break the shape is decreased, and degradation in eating texture and flavor can be prevented.

Also, according to the apparatus disclosed in Patent Document 3, in the cooking container, a process of cooling the cooking liquid after partially adding the raw rice for incomplete cooking is provided. Therefore, it is possible to prevent excessive progress of alpharization of mainly the remaining raw rice to be added after cooling to cause viscosity which makes it difficult to pump and transfer the mixture though the filling line to the retort pouch.

PRIOR ART DOCUMENTS

Patent Document

[Patent Document 1] Japanese Patent Application Laid-Open No. 6-303926
[Patent Document 2] Japanese Patent No. 4613610
[Patent Document 3] Japanese Patent Application Laid-Open No. 2002-142693

SUMMARY

Problems to be Solved by the Invention

However, the producing apparatus disclosed in Patent Document 3 has problems that the producing process is complicated and energy cost for production is high.

Also, in the retort rice meal produced by the apparatus disclosed in Patent Document 3, two rice grain groups with different rice-cooking histories are present, and the rice grains of one of the rice grain groups are crushed to a degree of not keeping the shape, and therefore it cannot necessarily be said that an excellent outer appearance is achieved.

Therefore, an object of the present invention is to provide a retort rice meal producing system capable of total production from raw rice up to a retort rice meal excellent in outer appearance by using a simple production process.

Means to Solve the Problems

To achieve the object described above, a retort rice meal producing system of the present invention includes a pressurized steamer mechanism performing a steam heating process on raw rice under pressurizing, thereby forming an gelatinized layer on a surface layer part of the raw rice grain and making a center part thereof porous, a steamed-rice single granulation mechanism removing surface-layer moisture from the steamed rice processed by the pressurized steamer mechanism for single granulation as being conveyed by a conveyer, a quantitative filling mechanism of measuring the steamed rice subjected to single granulation by the steamed-rice single granulation mechanism for each pack and filling a container with the steamed rice, a packing mechanism further filling the steamed-rice-filled container filled with the steamed rice by the quantitative filling mechanism with at least an amount of a liquid such as a rice-cooking liquid required for soaking and moisture absorption and air for allocating a head space, and sealing the container, a soaking/moisture-absorbing mechanism reversing a package of the container sealed by the packing mechanism a plurality of times and causing the rice-cooking liquid to be absorbed into the steamed rice, and a retort sterilizing apparatus performing a heat treatment on the steamed rice up to the center part, the steamed rice caused by the soaking/moisture-absorbing mechanism to absorb the rice-cooking liquid.

In the retort rice meal producing system described above, with the process in the pressurized steamer mechanism on raw rice having an approximately normal or lower moisture content, steamed rice is formed with an gelatinized layer formed on the surface layer part and a porous state appearing at the center part. With this, in the soaking/moisture-absorbing mechanism, the speed of moisture absorption to the steamed rice can be increased and the moisture absorption amount can be significantly increased. Also, in the packing mechanism, the filling amount of the liquid such as the rice-cooking liquid for the container filled with the steamed rice is adjusted, and the package after the container is sealed is filled with air to allocate a head space therein. In the soaking/moisture-absorbing mechanism, the tempering time for causing the rice-cooking liquid to be absorbed into the steamed rice as reversing the package a predetermined number of times is adjusted, for example. With this, the moisture absorption state of the steamed rice in the package and the amount of liquid left unabsorbed in the steamed rice in the package can be adjusted. Therefore, the eating texture can be freely adjusted according to the type of rice meal to be cooked, and a rice meal without viscosity and a viscous rice meal can be cooked according to different textures.

Effects of the Invention

With the structure described above, the retort rice meal producing system of the present invention is capable of total production from raw rice up to a retort rice meal excellent in outer appearance by using a simple production process.

DETAILED DESCRIPTION OF EMBODIMENTS

A retort rice meal producing system of the present invention is a retort rice meal producing system in which, for example, a pressuring, heating, and steaming process is performed on raw rice having a moisture content equal to or higher than 9% and equal to or lower than 13%, with a pressure of 0.07 to 0.38 MPa and a temperature condition of 115 to 150 degrees Celsius for one to five minutes to form an gelatinized layer of 0.3 to 0.8 mm on a surface layer part of rice grains and to make a center part thereof porous, a container (such as a pouch or a tray container) is filled with the resultant rice together with a predetermined amount of a rice-cooking liquid without cooling and sealed, and the rice grains are soaked into the rice-cooking liquid to cause the rice-cooking liquid to be absorbed into the rice grains, thereby allowing the degree of depth of alpharization and moisture of the cooked rice to be adjusted based on the water absorption state of the rice grains and the amount of the rice-cooking liquid in the container. Details of the retort rice meal producing system are described below by using the drawings.

First Embodiment

1. Raw Material Rice

In the present invention, any species of Japonica rice (short-grain species, Japanese type), Indica rice (long-grain species, Indian type), and Javanica rice (large-grain species, Java type) can be used as raw material rice. Also, pre-washed rice or wet-polished rice is preferable for use as raw material rice, but normal polished rice may be used. The raw material rice as these described above for use has an approximately normal moisture content or moisture content lower than 15%, which is lower than that of normal rice, preferably 9% to 14%, more preferably 9% to 13%, further preferably 11% to 12%.

The pre-washed rice refers to rice obtained by adding a moisture equal to or lower than 15% or slime substance for bran removal to polished rice and polishing the surface of the polished rice to remove bran left in fine grooves on the surface. Also, the wet-polished rice refers to rice obtained by polishing rice by adding water equal to or lower than 1% to remove most bran left on polished rice. If the pre-washed rice or the wet-polished rice is used, a sewage disposal plant for waste water occurring due to rice polishing is not required.

Figure 1:
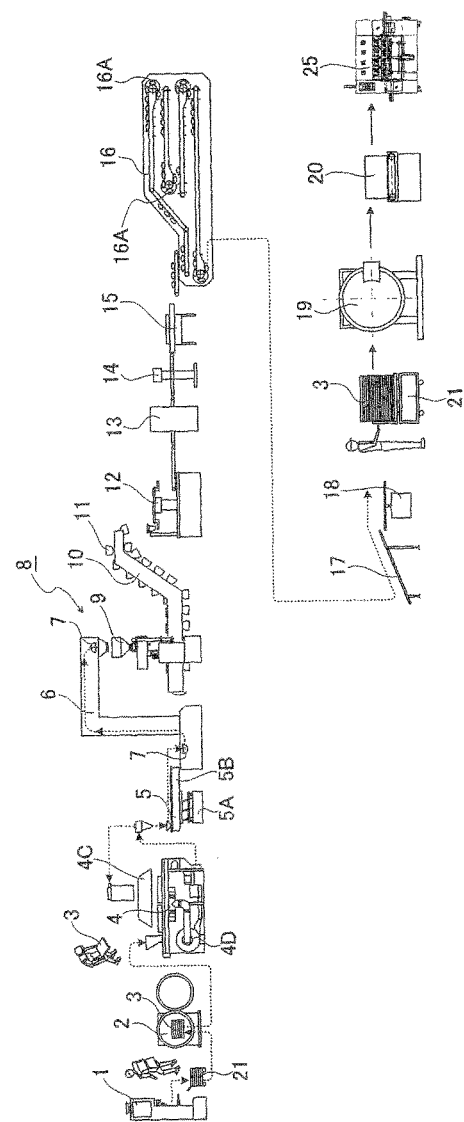
FIG. 1 depicts a schematic view of an entire flow of a retort rice meal producing system of the present invention.

2. Description of Entire Flow of the Retort Rice Meal Producing System in the Embodiment of the Present Invention FIG. 1 is an entire flow of a retort rice meal producing system of the present invention. In the present embodiment, a retort rice meal is produced by using the raw material rice with the flow as described below. However, the retort rice meal producing system of the present invention does not require each of the structures of the entire flow of FIG. 1 as indispensables, and part of the structures may be omitted, another structure may be added, or a structure may be replaced or modified.

(1) With a measuring mechanism 1, the raw material rice (pre-washed rice) is measured and dispensed for one tray (4.0 kg) to be brought into a pressurized steamer mechanism 2 described below.

(2) Twenty trays 3 each having a spread of 4.0 kg of raw material rice measured are brought into a pressurizing and heating furnace of the pressurized steamer mechanism 2, and the raw material rice is pressurized and heated with saturated vapor set at a predetermined pressure and temperature to form an gelatinized layer on a surface layer part and reform a center part thereof as porous.

(3) With a steamed-rice single granulation mechanism 4, moisture on the surface layer of the steamed rice brought out from the pressurizing and heating furnace of the pressurized steamer mechanism 2 is removed, and the steamed rice as a block-shaped chunk after being pressurized and heated in the pressurizing and heating furnace is loosened for single granulation.

(4) With a vibration feeder 5 vibrating the steamed rice subjected to single granulation, the steamed rice is supplied little by little to the next mechanism, that is, a bucket 7 of a bucket conveyer 6.

(5) With the bucket conveyer 6, the steamed rice is vertically conveyed and is supplied to the next mechanism, that is, an upper hopper of a metering machine 9 of a quantitative filling mechanism 8.

(6) In the metering machine 9, the steamed rice is measured for one package with a measuring box set in a predetermined capacity, and the steamed rice for one package is intermittently thrown into a bowl 11 of a bowl throwing conveyer 10.

(7) To the steamed rice thrown into the bowl 11 by the metering machine 9, a necessary ingredient is automatically or manually added as appropriate, and the steamed rice is conveyed by the bowl throwing conveyor 10 to a packing mechanism 12 to be thrown into a pouch.

(8) In the packing mechanism 12, the pouch with the steamed rice thrown thereinto is filled with a necessary rice-cooking liquid such as a seasoned liquid and enclosed to contain inert gas, and then the pouch is sealed.

(9) By an X-ray inspection apparatus 13 of an inspection mechanism, an inspection is performed regarding admixture of any foreign substance in the pouch and, by a weight inspection apparatus 14 of the inspection mechanism, the weight of the pouch is inspected.

(10) Any pouch determined by the inspection mechanism as a defective product is brought out of the system by a screening mechanism 15.

(11) With the pouch reversed by conveyers of a plurality of stages of a soaking/moisture-absorbing mechanism 16, the pouch is heated with warm air at 60 to 80 degrees Celsius to uniformly soak the steamed rice into the rice-cooking liquid to promote moisture absorption into the steamed rice.

(12) With a retort sterilizing apparatus 19, a heating process is performed on the center part of the steamed rice absorbing the rice-cooking liquid at 120 degree Celsius for four minutes or under temperature conditions which can bring equivalent effects. With this heating process, the steamed rice in a moisture absorbing state is alpharized to the center part. Here, the depth of alpharization described above varies depending on the moisture absorbing state of the steamed rice.

3. Details of Each Mechanism of the Retort Rice Meal Producing System

Details of each mechanism of the retort rice meal producing system are described below.

(1) Measuring Mechanism

The measuring mechanism 1 is, for example, a batch-type measuring machine which dispenses pre-washed white rice with a weight for one tray. As the measuring machine, a known measuring machine, GHP15B manufactured by SATAKE Corporation, was used, but, as a matter of course, the measuring mechanism 1 is not restricted to this. This measuring machine GHP15B can measure 0.5 to 15 kg at one time. In the present embodiment, 4.0 kg for one tray is dispensed, and the rice is distributed to each tray 3 for the pressurized steamer, and then the trays 3 are stacked, with ten on a front row and ten on a rear row, and delivered by a cart for stacking on a shelf of the pressurized steamer mechanism 2.

Note in the present embodiment that white rice is processed as pre-washed rice before measured by the measuring mechanism 1.

(2) Pressurized Steamer Mechanism

The pressurized steamer mechanism 2 is formed of the pressurizing and heating furnace, sterilizing the raw rice in the pressurizing and heating furnace and performing a steam heating process on the raw rice under pressure to form an gelatinized layer on the surface layer part and to make the center part porous. For example, twenty trays 3 each having a spread of approximately 4.0 kg of pre-washed rice measured by the measuring mechanism 1 are introduced by a cart 21 into the pressurizing and heating furnace, and a pressurizing, heating, and steaming process is performed with a pressure of 0.07 to 0.38 MPa at a temperature of 115 to 150 degrees Celsius.

Here, an example is shown using a steam-circulation-type cooking sterilizing apparatus 100-1B manufactured by BIOCON (JAPAN) LTD. as the pressuring and heating furnace of the pressurized steamer mechanism 2, but the pressurized steamer mechanism 2 is not restricted to this apparatus. Any model can be used as long as the pressurizing and heating furnace can process pre-washed rice under a pressurizing and heating vapor with a pressure of 0.07 to 0.38 MPa at a temperature of 115 to 150 degrees Celsius for one to five minutes.

Figure 2:
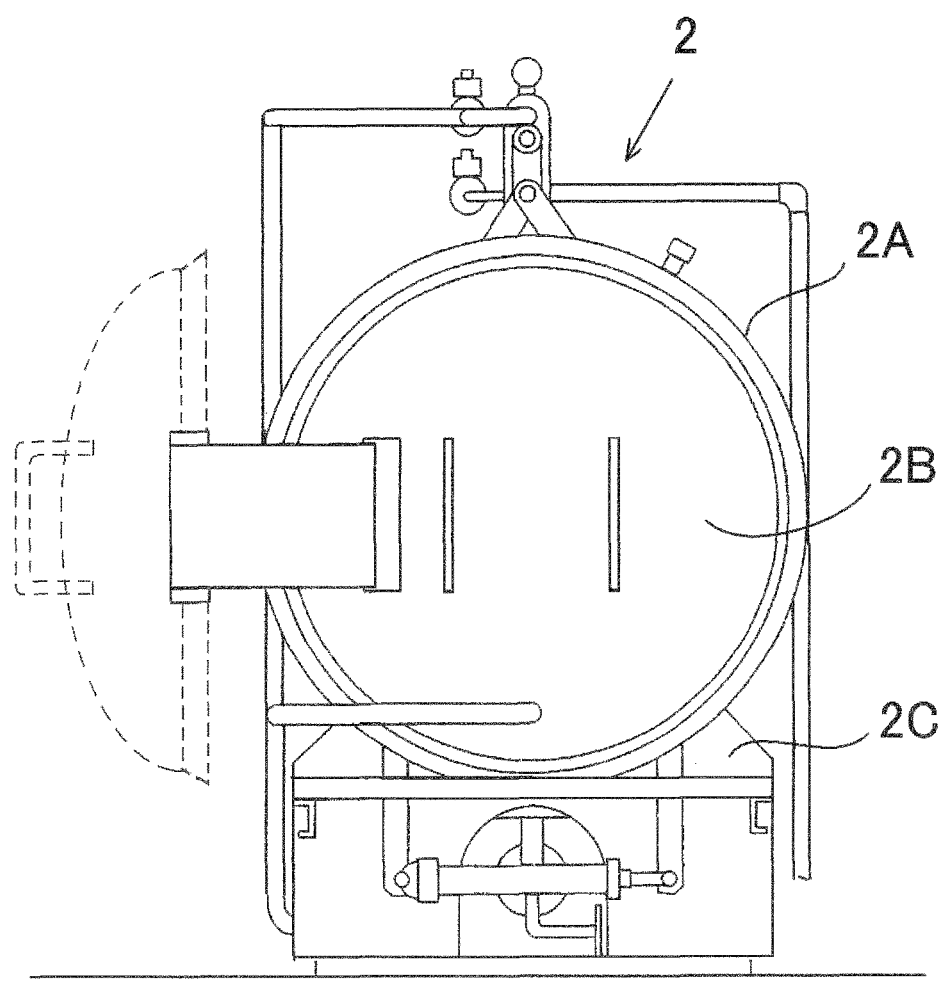
FIG. 2 depicts a front view of a heat steamer mechanism of the present invention.
Figure 3:
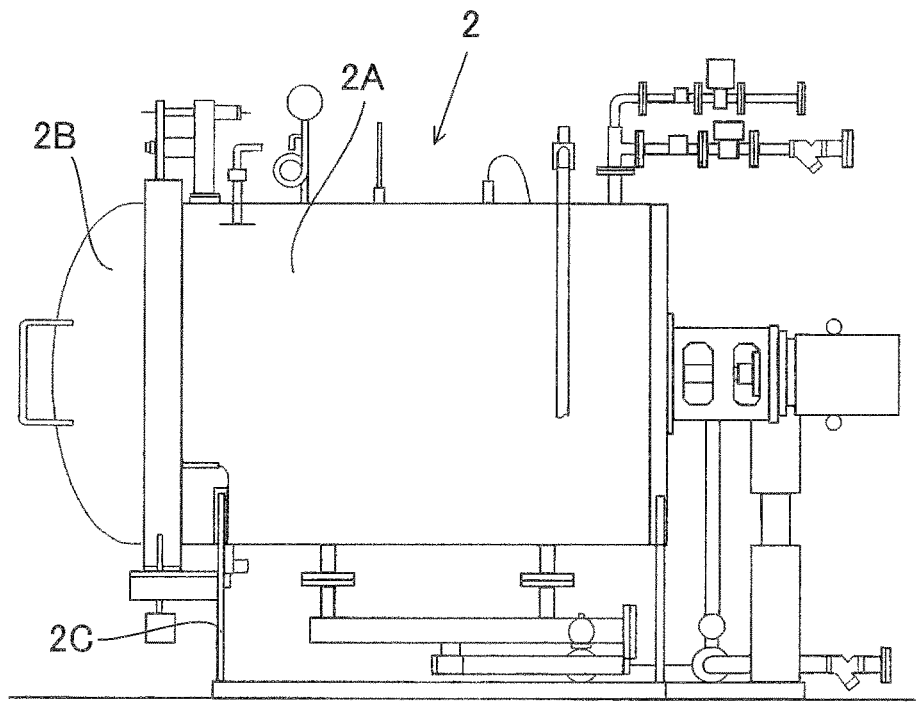
FIG. 3 depicts a side view of the heat steamer mechanism of the present invention.

A steam-circulation-type cooking sterilizing apparatus manufactured by BIOCON (JAPAN) LTD. depicted in FIG. 2 and FIG. 3 has full sizes with, approximately 1,500 mm in lateral width, 2,700 mm in depth, and 2,100 mm in height, and a furnace 2A has an inner diameter of 1,000 mm and a straight barrel length of 1,500 mm. Inside the furnace 2A, a total of twenty trays 3 can be accommodated, that is, ten stages in a front row and ten stages in a back row, each tray 3 having a thickness of 30 mm. The capability of processing raw material rice is 80 kg/batch. The inside of the furnace 2A has a structure in which dew condensation water in the furnace do not drip to the trays 3. The furnaces 2A, a frame 2C, and a lid 2B are all made of stainless steel, and the furnace 2A and the steam pipe are covered with an insulating material for food.

The steam-circulation-type cooking sterilizing apparatus manufactured by BIOCON (JAPAN) LTD. has an operating capability with a processing time within ten minutes/batch, a steam use amount equal to or smaller than 50 kg/batch, a supply gauge pressure equal to or lower than 0.3 MPa, an inner body temperature equal to or lower than 140 degrees Celsius, and a preheat time before operation on the order of twenty minutes. Also, the steam-circulation-type cooking sterilizing apparatus is assumed to be able to adjust an introduced steam flow rate, the saturated vapor temperature is 100 to 140 degrees Celsius, and a vapor circulation fan of 2.2 kW three-phase 200 V (inverter control) is provided.

(3) Steamed-Rice Single Granulation Mechanism

The steamed rice in a block shape bounded together as a result of the pressuring, heating, and steaming process in the pressuring and heating furnace of the pressurized steamer mechanism is subjected to single granulation by the steamed-rice single granulation mechanism 4.

Figure 4:
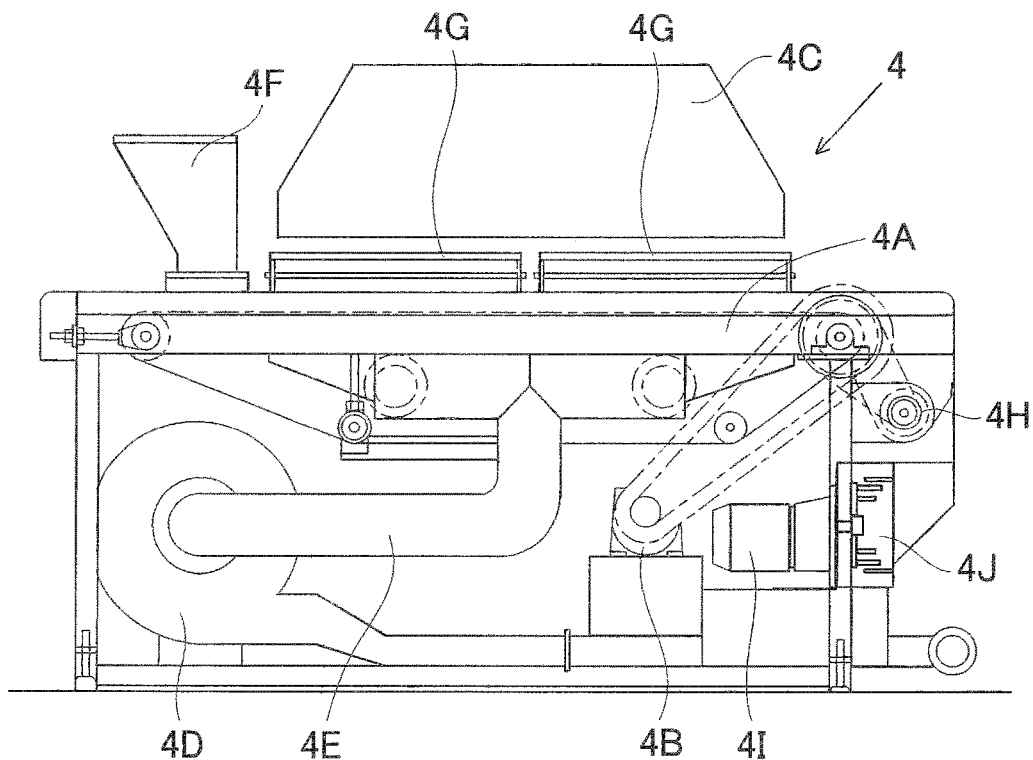
FIG. 4 depicts a front view of a steamed-rice single granulation mechanism of the present invention.
Figure 5:
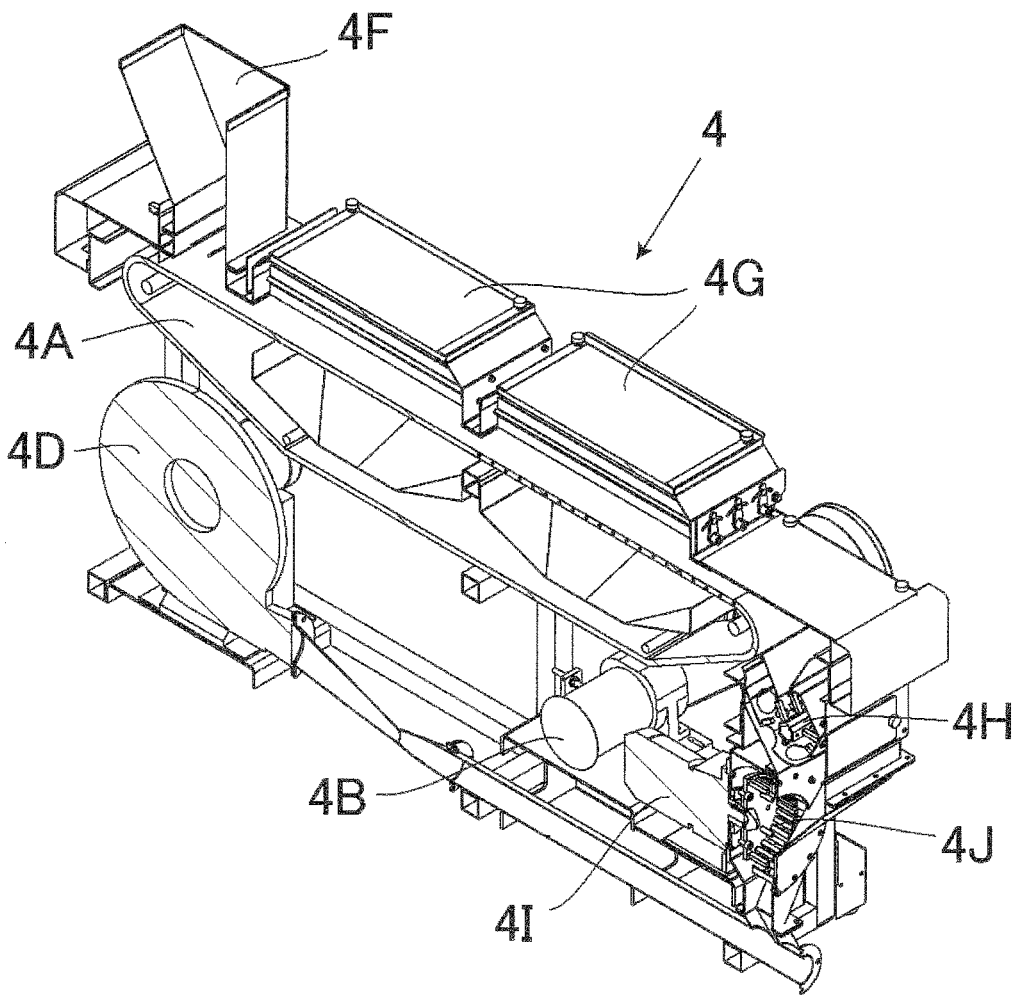
FIG. 5 depicts a perspective section view of the steamed-rice single granulation mechanism of the present invention.

FIG. 4 is a front view of the steamed-rice single granulation mechanism, and FIG. 5 is a perspective section view of the mechanism with a heater 4C, which will be described further below, omitted therefrom. The full sizes of the mechanism 4 are, approximately, 990 mm in width, 2170 mm in length, and 1330 mm in height.

An upper part of the steamed-rice single granulation mechanism 4 includes a horizontal conveyer 4A. For this conveyer 4A, a screen belt, that is, a net conveyer belt made of stainless steel and equipped with a chain, is used. This net conveyer belt is driven with 2 to 3 m/minute by a motor 4B with 0.2 kW and three-phase 200 V placed below, conveying steamed rice at a predetermined speed. Note that the screen belt has many apertures formed with a size such that the steamed rice does not fall therethrough and the apertures are not clogged with the steamed rice, thereby preventing the steamed rice from being attached to the screen belt.

Above the conveyer 4A, two air filters 4G are placed near the conveyer. Furthermore, the heater 4C for heating air is provided above the air filters 4G.

Below the conveyer 4A, a suction fan 4D is installed. With a negative pressure being generated to a duct 4E provided below the conveyer 4A, air heated by the heater 4C is let pass through the air filters 4G and the conveyer 4A to remove moisture on the front surface of the steamed rice on the net conveyer belt. In the suction fan 4D, a drive motor with 0.75 kW and three-phase 200 V is used. Note that by adjusting the driving speed of the net conveyer belt, removal of moisture on the front surface of the steamed rice is performed for 30 to 45 seconds.

Above one end of the conveyer 4A, a hopper 4F is provided for throwing a block shape of steamed rice after processed by the pressurized steamer mechanism 2. Supply of the steamed rice from the hopper 4F is performed through stable successive throwing, and has a first-in first-out structure.

As depicted in FIG. 5, a mechanism for loosing the block shape of steamed rice for single granulation is provided on an exit side of the conveyer 4A.

Straight below the exit side of the conveyer 4A, a rotary vane member 4H is provided also using the motor 4B for the net conveyer belt as a drive source. The block shape of steamed rice with moisture on the surface layer removed falling from a transfer end of the net conveyer belt is roughly loosened by the rotary vane member 4H. Also, below the rotary vane member 4H, a rotary pin 4J rotated by a motor 4I is placed. The steamed rice roughly loosened by the rotary vane member 4H is slammed onto the rotary pin 4J for single granulation.

(4) Vibration Feeder

The steamed rice subjected to single granulation in a manner as described above is supplied to the vibration feeder 5, being transferred little by little toward the bucket conveyer 6. The vibration feeder 5 has a trough 5B mounted on a vibration table 5A and, with the trough 5B being vibrated, the steamed rice subjected to single granulation is caused to proceed over the trough 5B with an even thickness and move toward the bucket conveyer 6.

(5) Bucket Conveyer

The steamed rice moved by the vibration feeder 5 toward the bucket conveyer 6 is supplied to the bucket 7 of the bucket conveyer 6. The bucket conveyer 6 has a structure in which a horizontal conveyer and a vertical conveyer are combined together so as to be able to deliver a load to be carried from a horizontal direction to a vertical direction and then again to the horizontal direction. The bucket conveyer 6 can convey the steamed rice supplied to the bucket 7 without impairing the original form of the steamed rice, thereby generating less fracture and abrasion of the load to be conveyed.

(6) Metering Machine

The steamed rice conveyed by the bucket conveyer 6 is thrown from the bucket 7 into the hopper of a measure-type metering machine (a volume filler) 9. The hopper of the metering machine 9 is equipped with sensors for detecting an upper limit and a lower limit of the capacity. The bucket conveyer 6 continues to supply steamed rice until the upper-limit sensor detects steamed rice. When the lower-limit sensor detects the absence of steamed rice, the metering machine 9 gives an alarm to report a shortage of the raw material. A predetermined amount of the steamed rice thrown into the hopper of the metering machine 9 is measured by the measuring box set at a predetermine capacity.

Note in the present embodiment that while the quantitative filling mechanism 8 is configured of the bucket conveyer 6, the metering machine 9, and the bowl throwing conveyer 10, which will be described further below, the quantitative filling mechanism 8 does not require these components as indispensables, and can include at least the metering machine 9. That is, the structure may be such that the metering machine 9 is filled with steamed rice from the steamed-rice single granulation mechanism 4 and the steamed rice is thrown via the bowl throwing conveyer 10 into the pouch, or may be such that the steamed rice is directly thrown from the metering machine 9 into the pouch.

Figure 6:
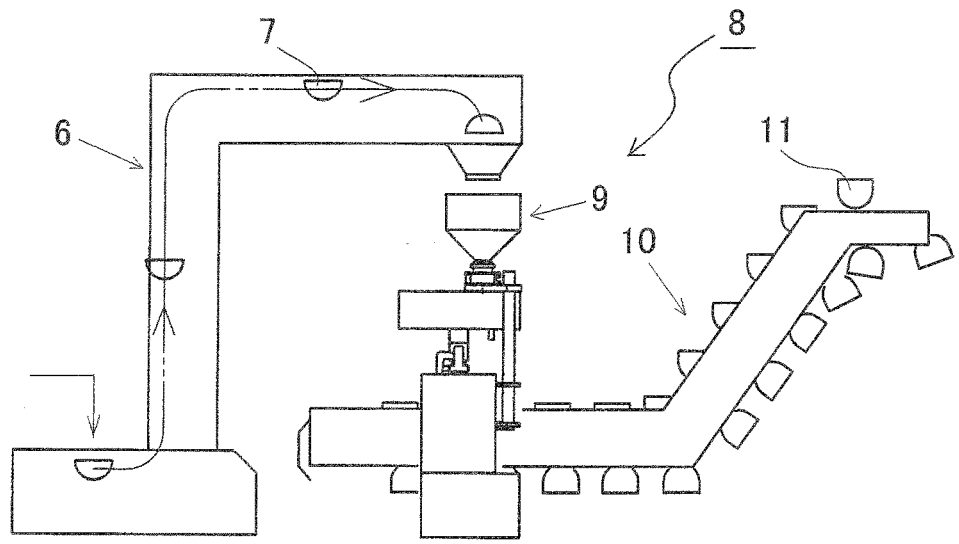
FIG. 6 depicts a front view of a quantitative filling mechanism of the present invention.

Furthermore, the upper hopper of the metering machine 9 of the quantitative filling mechanism 8 includes a heater or a heat insulating mechanism (not shown) as a heat insulating structure, thereby allowing a decrease in temperature of the steamed rice to be suppressed. FIG. 6 is a front view of the quantitative filling mechanism 8.

(7) Bowl Throwing Conveyer

The bowl throwing conveyer 10 is a conveyer capable of delivering a load to be carried in a horizontal, diagonal, and horizontal direction, and a plurality of bowl-shaped containers made of synthetic resin, that is, the bowls 11, are attached to the conveyer with predetermined spacing. The bowls 11 are kept in a horizontal state even at the time of moving in the diagonal direction, and are reversed at the tip of the conveyer to let the contents fall down in the vertical direction.

In the present embodiment, in the quantitative filling mechanism 8, a predetermined amount (one pack) of steamed rice is thrown from the metering machine 9 into the bowl 11 of the bowl throwing conveyer 10. Then, for a product requiring ingredients, such as seasoned rice cooked with various kinds of ingredients or paella, ingredients necessary for one pack are thrown into this bowl 11.

In normal seasoned rice cooked with various kinds of ingredients and paella, for example, four to six types of ingredients are mixed, and therefore throwing the ingredients into the bowls 11 in the course of conveying the steamed rice with the bowl throwing conveyer 10 is efficient.

In throwing the ingredients, a measuring/counting machine of quantitative filling or a computer scale pipe type can be used. Also, an ingredient difficult to automatically measure can be measured by hand. In both cases, an ingredient is intermittently thrown into the bowl 11 on a horizontal part of the bowl throwing conveyer 10.

The bowl throwing conveyer 10 throws the steamed rice and ingredients from the bowls 11 into the pouch upon throwing permission by the packing mechanism 12, which will be described further below. Also, the horizontal part of the bowl throwing conveyer 10 on a packing mechanism 12 side is structured to be stretchable.

Note that if the number of types of ingredients is small, the ingredients can be directly thrown into the pouch after the steamed rice is thrown in the packing mechanism 12.

(8) Packing Mechanism

Figure 7:
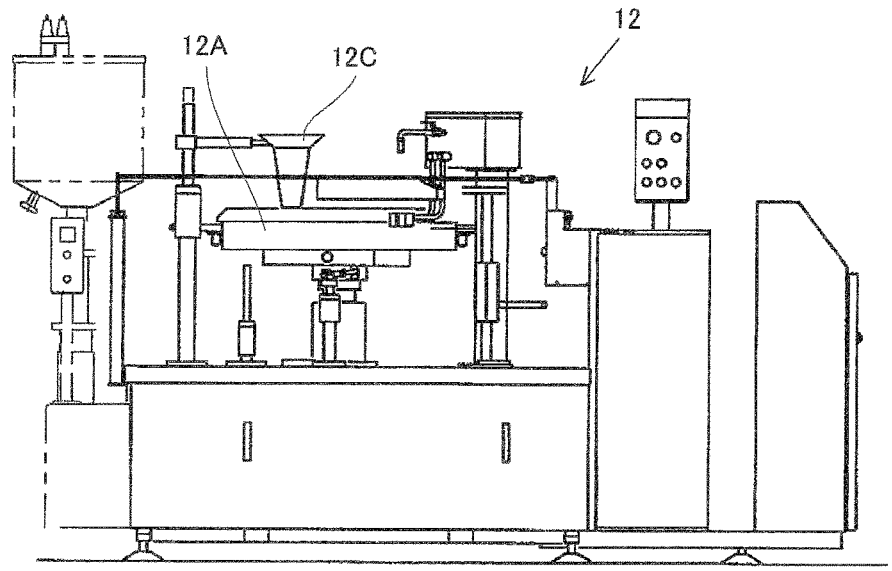
FIG. 7 depicts a front view of a packing mechanism of the present invention.
Figure 8:
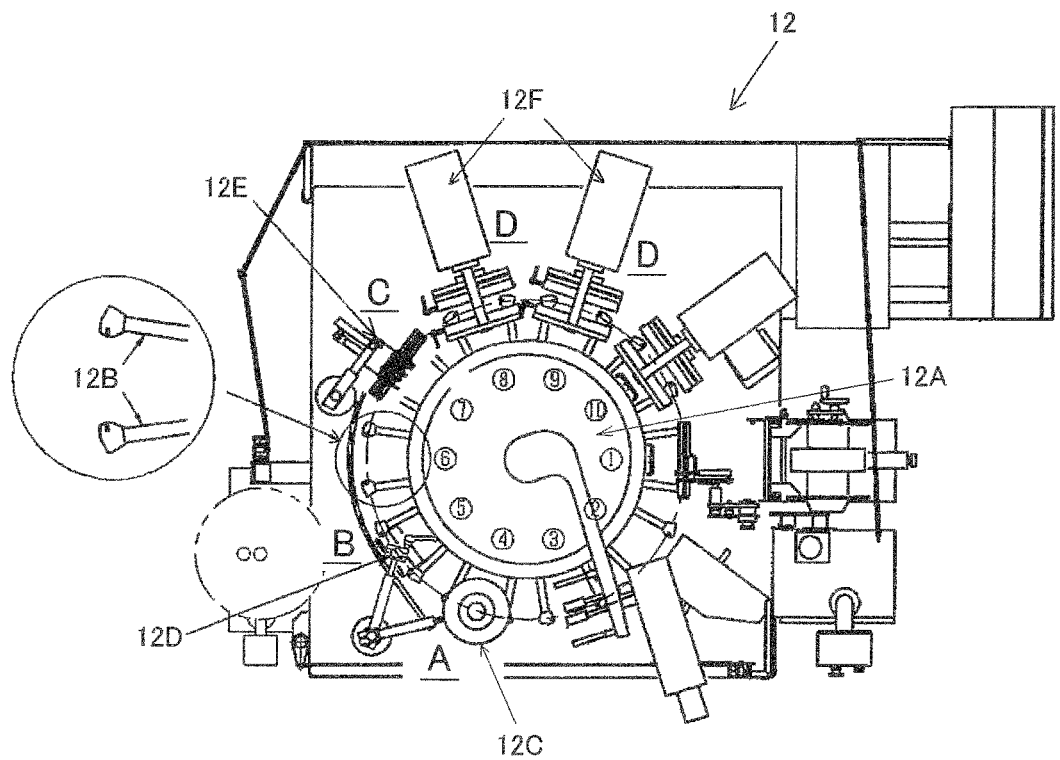
FIG. 8 depicts a plan view of the packing mechanism of the present invention.

As the packing mechanism 12, a rotary-type packing machine is used in the present embodiment. Here, FIG. 7 depicts a front view of the rotary-type packing machine for use in the present embodiment. Also, FIG. 8 depicts a plan view of the rotary-type packing machine for use in the present embodiment.

The rotary-type packing machine 12 includes a plurality of sets of clamp arms 12B, with every two taken as one set, around a disk-shaped rotor 12A. Clamps set at the tips of the respective clamp arms support both side edges of a pouch, and intermittently rotate by one pitch as hanging the pouch. Then, while the pouch is suspended in a steamed-rice filling section A, the steamed rice and the ingredients are thrown from the bowls 11 to a steam-rice throwing hopper 12C to fill the pouch. Note that in the packing mechanism 12, the steamed rice and the ingredients are permitted to be thrown into the bowl throwing conveyer 10 only when the pouch is sufficiently opened.

After the steamed rice and the ingredients for one package are thrown into the pouch in the steamed-rice filling section A, the pouch is filled, in a liquid filling section B that comes next, with an amount of rice-cooking liquid or a seasoned liquid necessary for soaking and rice cooking from a liquid filling nozzle 12D. In this case, to promote a soaking effect, the temperature of the rice-cooking liquid or the seasoned liquid is desirably heated at 60 degrees Celsius.

In a gas filling section C that comes next, to allocate a head space of 45% to 70%, the pouch is filled with inert gas such as nitrogen gas from a gas filling nozzle 12E. Then, furthermore in a seal section D that comes next, the pouch is sealed by a sealing apparatus 12F to make a package. Note that the rotary-type packing machine 12 has a packing capability of 1,800 packages/h or more.

Here, in the present invention, the packing mechanism 12 is not restricted to a rotary-type packing machine and, needless to say, may be a horizontal-type packing machine, that is, a packing machine for filling a pouch with steamed rice, ingredients, and a rice-cooking liquid as being linearly conveyed and further filling the pouch with inert gas for allocating a head space and then sealing the pouch.

(9) Inspection and Screening Mechanisms

On a downstream part of the packing mechanism 12, an inspection mechanism is provided. The inspection mechanism includes the X-ray inspection apparatus 13 and the weight inspection apparatus 14. By the X-ray inspection apparatus 13, an inspection is performed regarding admixture of any foreign substance in the pouch and, by the weight inspection apparatus 14, the weight of the pouch is inspected. Furthermore, on a downstream part of the weight inspection apparatus 14, a screening mechanism 15 is provided, bringing a pouch determined by the X-ray inspection apparatus 13 and the weight inspection apparatus 14 as a defective product out of the system.

(10) Soaking/Moisture-Absorbing Mechanism

A pouch determined as a conforming item by the inspection and screening mechanisms is conveyed to the soaking/moisture-absorbing mechanism 16. Prior to this soaking process, an apparatus that continuously or intermittently emits normal-pressure microwaves can be provided.

Figure 9:
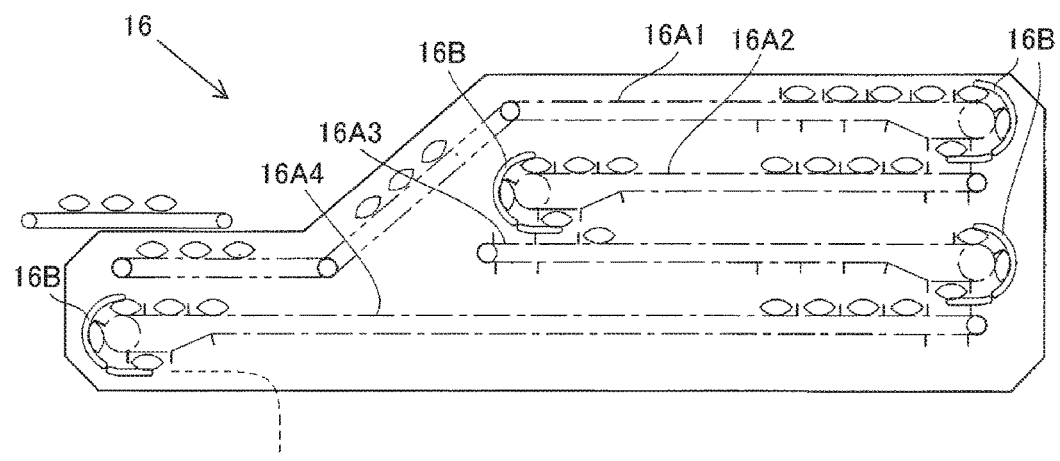
FIG. 9 depicts a front view of a soaking/moisture-absorbing mechanism of the present invention.

FIG. 9 is a front view of the soaking/moisture-absorbing mechanism 16 for use in the present embodiment.

The soaking/moisture-absorbing mechanism 16 is configured of belt conveyers 16A1 to 16A4 of a four-stage structure. Every time a pouch falls down from the conveyer 16A1 of a first stage to the conveyer 16A2 of a second stage, from the conveyer 16A2 of the second stage to the conveyer 16A3 of a third stage, and from the conveyer 16A3 of the third stage to the conveyer 16A4 of a fourth stage, the pouch is reversed. With this, the entire steamed rice and ingredients are uniformly soaked in the rice-cooking liquid or the seasoned liquid for moisture absorption.

Also, in the soaking/moisture-absorbing mechanism, the temperature of the pouch is heated with hot air at 60 to 80 degrees Celsius, thereby promoting soaking of the steamed rice and ingredients into the rice-cooking liquid or the seasoned liquid for moisture absorption.

Soaking and moisture absorption of the steamed rice are performed by turning the pouch over a total of four times by the belt conveyers 16A1 to 16A4 of the four-stage structure of the soaking/moisture-absorbing mechanism 16. Here, soaking/moisture-absorbing time is adjusted by controlling the speed of the conveyers.

Note that a guide cover 16B is provided at an end of each of the belt conveyers of the four-stage structure. The pouch falls downs as being guided by the guide cover 16B when making a transfer from an upper stage to a lower stage of the belt conveyer, thereby mitigating an impact due to falling and achieving a reliable reversal.

Then, pouches with soaking/moisture-absorption completed are conveyed by a rising conveyer 17 to be temporarily pooled on a rotary table 18. Furthermore, the pouches are arranged on a tray 3, and are brought by a cart 21 into a retort sterilizing apparatus 19.

(11) Retort Sterilizing Apparatus

A heat treatment equivalent to four minutes with the temperature of a food center part set at 120 degrees Celsius, which are retort heating conditions, is performed, or a process with conditions that bring effects equivalent to or more than the above is performed, for example, a process for thirty five minutes at 115 degrees Celsius is performed, for cooking. Note that in general, approximately fifty minutes to sixty minutes of time are required in the processes of temperature increase, sterilization, and cooling in the retort sterilizing apparatus 19. In the retort sterilizing apparatus of the present embodiment, a furnace with a capacity capable of accommodating 1,800 packs per batch is used.

By increasing the temperature of the center part of the steamed rice at the predetermined temperature for cooking, in the soaking/moisture-absorbing mechanism, the steamed rice in a predetermined moisture-absorbing state is alpharized up to the center part. Here, the depth of alpharization varies depending on the moisture-absorbing state of the steamed rice. If the steamed rice is in a saturated moisture-absorbing state, the rice grains are alpharized completely to the core.

On the surface of the pouch brought out from the retort sterilizing apparatus after the retort sterilizing process ends, water droplets of cooling water used in the cooling process are attached. By letting the pouch pass through a moisture removing machine 20 that delivers a blast of air, the water droplets are blown away. After an inspection by a pinhole inspection apparatus 25, the pouches are packed in boxes for shipping.

(12) Control Mechanism

Each mechanism and apparatus is required to control the operation by a control mechanism (not shown) with reference to the speed of any mechanism or apparatus. In the present embodiment, control is performed with reference to a steamed-rice filling speed of the packing mechanism 12. Since the packing mechanism 12 requires time compared with other mechanisms and apparatuses, the steamed-rice filling speed is used as a reference, and the entire balance can be achieved.

4. Texture-Specific Rice Meal Cooking Mechanism

According to the retort rice meal producing system in the above-described embodiment of the present invention, raw rice having an approximately normal moisture content or lower, that is, lower than 15%, preferably having a moisture content equal to or higher than 9% and equal to or lower than 13%, is used, and various conditions including pressure, temperature, and processing time in the pressuring, heating, and steaming process are set by the pressurized steamer mechanism 2 as appropriate. With this, the thickness of the gelatinized layer formed on the surface layer part of the steamed rice and the porous state appearing at the center part of the rice grain can be adjusted.

Then, in the packing mechanisms 12 and 22, the amount of the liquid for filling the container together with the steamed rice and ingredients subjected to the pressuring, heating, and steaming process is adjusted and, in the soaking/moisture-absorbing mechanism 16, the soaking/moisture-absorbing time of the steamed rice is adjusted. With this, a rice meal with a less-viscous eating texture and a viscous rice meal can be cooked according to different textures.

(1) Rice Meal with Less-Viscous Eating Texture

First, in the pressurized steamer mechanism 2, an gelatinized layer with a thin thickness on the order of 0.3 mm is formed on the surface of the rice grains, and the pressurizing, heating, and steaming process is performed so that a porous state appears a little at the center part.

Next, in the packing mechanisms 12 and 22, the container is filled with a small amount of a liquid such as water together with the steamed rice and ingredients subjected to the pressurizing, heating, and steaming process, is filled with inert gas, and is then sealed, thereby allocating a sufficient head space (for example, 60%) in a package of the container.

Then, in the soaking/moisture-absorbing mechanism 16, the time for soaking and water absorbing is set short (for example, twenty-five minutes and five reversals). With this, a rice meal with a less-viscous eating texture can be efficiently produced.

(2) Viscous Rice Meal

On the other hand, in the pressurized steamer mechanism 2, an gelatinized layer with a thick thickness on the order of 0.8 mm is formed on the surface of the rice grains, and the pressurizing, heating, and steaming process is performed so that a porous state appears more at the center part.

Next, in the packing mechanisms 12 and 22, the ratio of a liquid for filling the container together with the steamed rice and ingredients is increased compared with the case of producing a rice meal with a less-viscous eating texture described above. Also in this case, as with the above, a sufficient head space (for example, 60%) is allocated in a package.

Then, in the soaking/moisture-absorbing mechanism 16, the time for soaking and water absorbing is set slightly long (for example, thirty-five minutes and five reversals) compared with the case of the producing a rice meal with a less-viscous eating texture described above. With this, a viscous rice meal can be efficiently produced.

To cook a rice meal according to each different eating texture, the retort rice meal producing system of the present invention includes a texture-specific rice meal cooking mechanism as described below.

First, the pressurized steamer mechanism 2 includes pressurized steamer setting means setting various conditions of a pressure and temperature of steam and processing time on the raw rice. The pressurized steamer setting means includes an adjusting mechanism (for example, a valve device or a servo device) adjusting the pressure of the pressurizing and heating furnace of the pressurized steamer mechanism 2. With a steam fed into the pressurizing and heating furnace, the pressure and temperature of the inside of the furnace are set at a predetermined pressure and temperature as being measured by sensors. Also, the pressurized steamer mechanism 2 includes a timer mechanism setting a processing time. With the pressurizing and heating conditions and processing time, the thickness of the gelatinized layer formed on the surface layer part of the steamed rice and the porous state appearing at the center part of the rice grain are adjusted.

The packing mechanisms 12 and 22 each include liquid filling amount setting means setting a filling amount of the liquid such as the rice-cooking liquid for the container filled with the steamed rice. Furthermore, the packing mechanisms 12 and 22 each include air filling amount setting means setting a filling amount of the air such as nitrogen gas for the container to allocate the head space of the package after sealing.

In the liquid filling amount setting means of the rotary-type packing machine 12 of the first embodiment, the liquid filling nozzle 12D for filling with a liquid such as a rice-cooking liquid after the steamed-rice filling section A is placed for filling with the liquid while the flow rate of the liquid is measured. To cook a desired rice meal, for example, the liquid is set less for a retort rice meal with a paella-like, less-viscous eating texture, and the liquid is set more for a porridge. As such, a preparation is made based on data in advance for settings according to each type of rice meal.

In the air filling amount setting means, to sufficiently allocate a head space of the package, the gas filling nozzle 12E is placed after the liquid filling section B, thereby filling the container with inert gas such as nitrogen gas. The amount of inert gas for filling from the gas filling nozzle 12E is also measured by a flowmeter or the like to fill the container.

The soaking/moisture-absorbing mechanism 16 includes at least tempering setting means setting a tempering time for causing the rice-cooking liquid to be absorbed into the steamed rice as reversing the package with the allocated head space a plurality of times. The tempering setting means adjusts at least the time in soaking and moisture absorbing after filling and sealing while the package with the allocated sufficient head space (for example, 60%) is conveyed by the belt conveyers with the multiple-stage structure. With this, the raw material rice or a solid can be uniformly soaked in the liquid without unevenness for moisture absorption.

Also, in the soaking/moisture-absorbing mechanism 16, soaking the steamed rice into the rice-cooking liquid or the seasoned liquid for moisture absorption is promoted totally and uniformly while the temperature is being increased with warm air at 60 to 80 degrees Celsius. Therefore, the temperature of the warm air may also be adjusted together with the tempering time.

The pressurized steamer setting means, the liquid filling amount setting means, the air filling amount setting means, and the tempering setting means may be controlled by a control apparatus in a centralized manner, or may be controlled manually.

As described above, according to the retort rice meal producing system of the present invention, granular and viscous rice meal completely alpharized into the core with a soft interior and a hard exterior (viscous rice meal) and rice meal with a less viscous eating texture (rice meal with a hard core) can be produced, and various types of rice meal can be produced, such as white rice, rice gruel, rice porridge, seasoned rice cooked with various kinds of ingredients, seasoned rice cooked with another ingredient, curry, gukbap (Korean rice soup), pilaf, Chinese fried rice, paella, and risotto.

In particular, according to the retort rice meal producing system of the present invention, even if a long grain type with low moisture conventionally used mainly for producing a rice meal with a less viscous eating texture is taken as raw material rice, a more viscous rice meal can be produced compared with the conventional long grain type.

Second Embodiment

Figure 10:
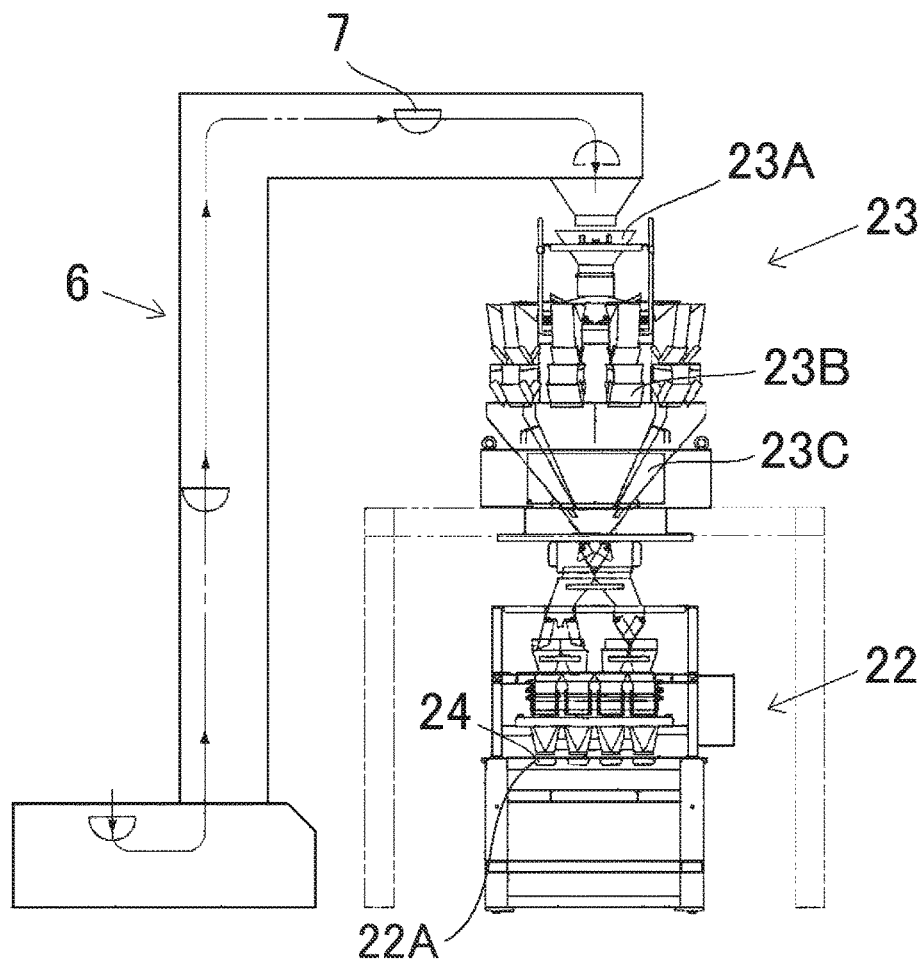
FIG. 10 depicts a front view of a quantitative filling mechanism and a packing mechanism of another embodiment of the present invention.
Figure 11:
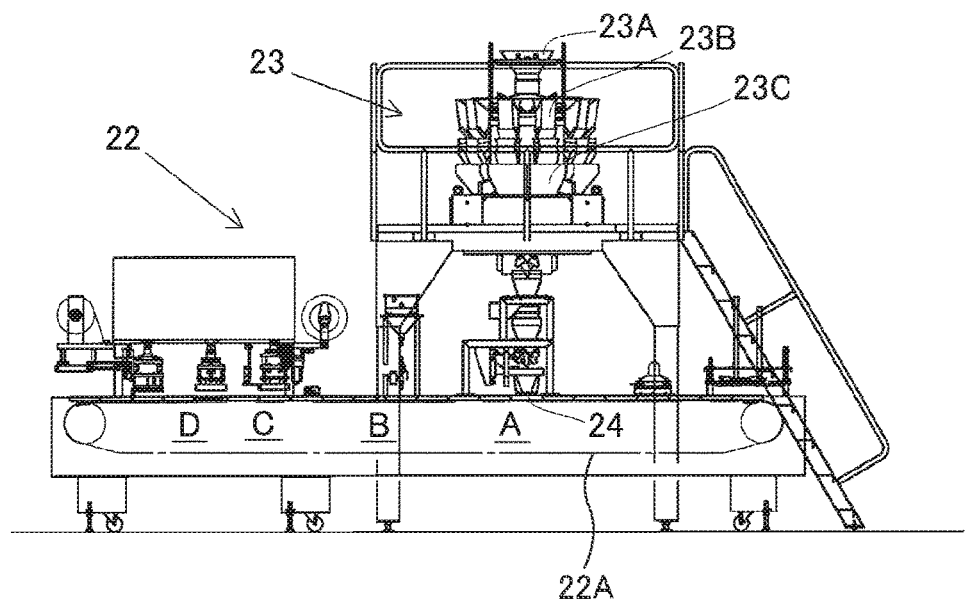
FIG. 11 depicts a side view of the quantitative filling mechanism and the packing mechanism of the other embodiment of the present invention.
Figure 12:
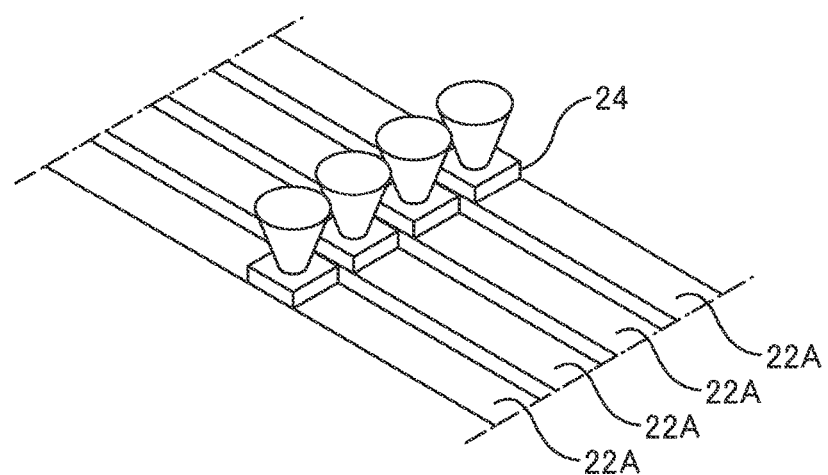
FIG. 12 depicts a perspective view of the packing mechanism of the other embodiment of the present invention, including four rows of conveyers.

FIG. 10 depicts a front view of a quantitative filling mechanism and a packing mechanism of a retort rice meal producing system using a tray packing machine, and FIG. 11 depicts a side view thereof. While the quantitative filling mechanism 8 in the first embodiment is configured of the bucket conveyer 6, the metering machine 9, and the bowl throwing conveyer 10 as depicted in FIG. 6, the quantitative filling mechanism in the second embodiment is configured of the bucket conveyer 6 and a combined measuring machine 23. Also, while pouches are used as packaging containers in the first embodiment, tray containers 24 are used in the second embodiment.

In the retort rice meal producing system in the second embodiment, the structures other than the quantitative filling mechanism are identical to those of the first embodiment, and therefore description of these structures is omitted herein.

In the retort rice meal producing system of the second embodiment, steamed rice conveyed by the vibration feeder 5 is supplied to the bucket 7 of the bucket conveyer 6 and is conveyed toward the combined measuring machine 23. The combined measuring machine 23 is a known measuring machine, distributing the steamed rice thrown from the bucket 7 of the bucket conveyer 6 into a hopper 23A to a plurality of weight measuring machines 23B placed on a circumference. Then, based on the weight of the steamed rice measured by each weight measuring machine 23B, a plurality of weight measuring machines 23B measuring one container 24 for one tray are selected, and a lower end of each of the selected weight measuring machines 23B is opened to discharge the steamed rice to a chute 23C.

Below the combined measuring machine 23, a tray packing machine 22 is placed as a packing mechanism. The tray packing machine 22 includes four rows of conveyers 22A so as to intermittently or continuously convey the tray containers 24 in four rows, thereby filling each of the tray containers 24 with the steamed rice discharged from the chute 23C of the combined measuring machine 23 in the steamed-rice filling section A on the conveyer.

Note that while the conveyers 22A of the tray packing machine 22 are in four rows, it goes without saying that the number of conveyers 22A is not restricted to four rows.

Then, the tray containers 24 filled with the steamed rice are conveyed by the conveyer, are filled with the rice-cooking liquid or the seasoned liquid in the liquid filling section B, are filled with inert gas such as nitrogen gas in the gas filling section C, and are then sealed in the seal section D, thereby sent as packages to the downstream X-ray inspection apparatus 13.

INDUSTRIAL APPLICABILITY

The retort rice meal producing system of the present invention is useful as being capable of total production from raw rice up to a retort rice meal excellent in outer appearance by using a simple production process.

DESCRIPTION OF REFERENCE NUMERALS 1 measuring mechanism
2 pressurized steamer mechanism
3 tray
4 steamed-rice single granulation mechanism
5 vibration feeder
6 bucket conveyer
7 bucket
8 quantitative filling mechanism
9 metering machine
10 bowl throwing conveyer
11 bowl
12 packing mechanism (rotary-type packing machine)
13 X-ray inspection apparatus
14 weight inspection apparatus
15 screening mechanism
16 soaking/moisture-absorbing mechanism
17 rising conveyer
18 rotary table
19 retort sterilizing apparatus
20 moisture removing machine
21 cart
22 packing mechanism (tray packing machine)
23 combined measuring machine
24 tray container
25 pinhole inspection apparatus

The invention claimed is:

1. A retort rice meal producing system comprising:
a pressurized steamer device including a pressurizing and heating furnace for performing a steam heating process on raw rice under pressure greater than atmospheric pressure to form a gelatinized layer on a surface layer part of the raw rice and to make a center part thereof porous;
a steamed-rice single granulation device, including a horizontal conveyer belt in an upper part of the steamed-rice single granulation device, a motor for driving the conveyer belt to convey the steamed rice processed by the pressurized steamer device, an air filter located above the conveyer belt, a heater for heating the air provided above the air filter, a suction fan installed below the conveyer belt, a rotary vane, and a rotary pin,
wherein surface-layer moisture is removed from the steamed rice being conveyed by the conveyer belt, and the steamed rice loosened by the rotary vane is then slammed onto the rotary pin for single granulation;
a quantitative filling system including a metering machine for measuring the steamed rice subjected to single granulation by the steamed-rice single granulation device for a retort rice meal pack and filling a container with the steamed rice;
a packing device for further filling the container filled with the steamed rice by the quantitative filling system with at least an amount of a liquid such as a rice-cooking liquid required for soaking and moisture absorption,
the packing device including a plurality of sets of clamp arms disposed around a disk-shaped rotor to clamp opposed side edges of the container and to carry the container around the rotor sequentially from a steamed-rice filling part, a liquid filling part disposed downstream of the steamed-rice filling part to add the liquid to the container from a liquid filling nozzle, a gas filling part disposed downstream of the liquid filling part to fill the container with inert gas from a gas filling nozzle, and a sealing part that uses a sealing apparatus;
a soaking/moisture-absorbing device for reversing a package of the container sealed by the packing device a plurality of times and causing the liquid to be absorbed into the steamed rice; and
a retort sterilizing apparatus for performing a heat treatment on the steamed rice into which the liquid is absorbed through the soaking/moisture-absorbing device up to the center part thereof, the retort sterilizing apparatus being a furnace,
wherein the quantitative filling system has the metering machine with an upper hopper, which is at least provided with a heater for quantitative filling of the steamed rice processed by the pressurized steamer device without cooling;
wherein the soaking/moisture-absorbing device is a conveyer device with a plurality of vertical stages for reversing the package when conveying the package from an upper stage to a lower stage to cause the liquid to be absorbed into the steamed rice, and includes multiple belt conveyers, a guide cover at an end of each of the belt conveyers, and an ascending conveyer leading to a rotary table.

2. The retort rice meal producing system according to claim 1, wherein the container is a pouch, and the quantitative filling system is configured to include a bucket conveyer conveying the steamed rice subjected to single granulation, the metering machine measuring the steamed rice conveyed by the bucket conveyer only for one pouch, and a bowl-type throwing conveyer filling the pouch with the steamed rice measured by the metering machine.

3. The retort rice meal producing system according to claim 1, wherein the container is a tray container, the quantitative filling system is configured to include a bucket conveyer conveying the steamed rice subjected to single granulation and the metering machine measuring the steamed rice conveyed by the bucket conveyer only for one tray container and filling the tray container with the steamed rice, and a tray packing machine is used as the packing device.

\* \* \* \* \*